K. P. McELROY.
PROCESS OF AND APPARATUS FOR OXIDIZING HYDROCARBONS.
APPLICATION FILED AUG. 2, 1912. RENEWED MAR. 18, 1916.
1,253,617.
Patented Jan. 15, 1918.
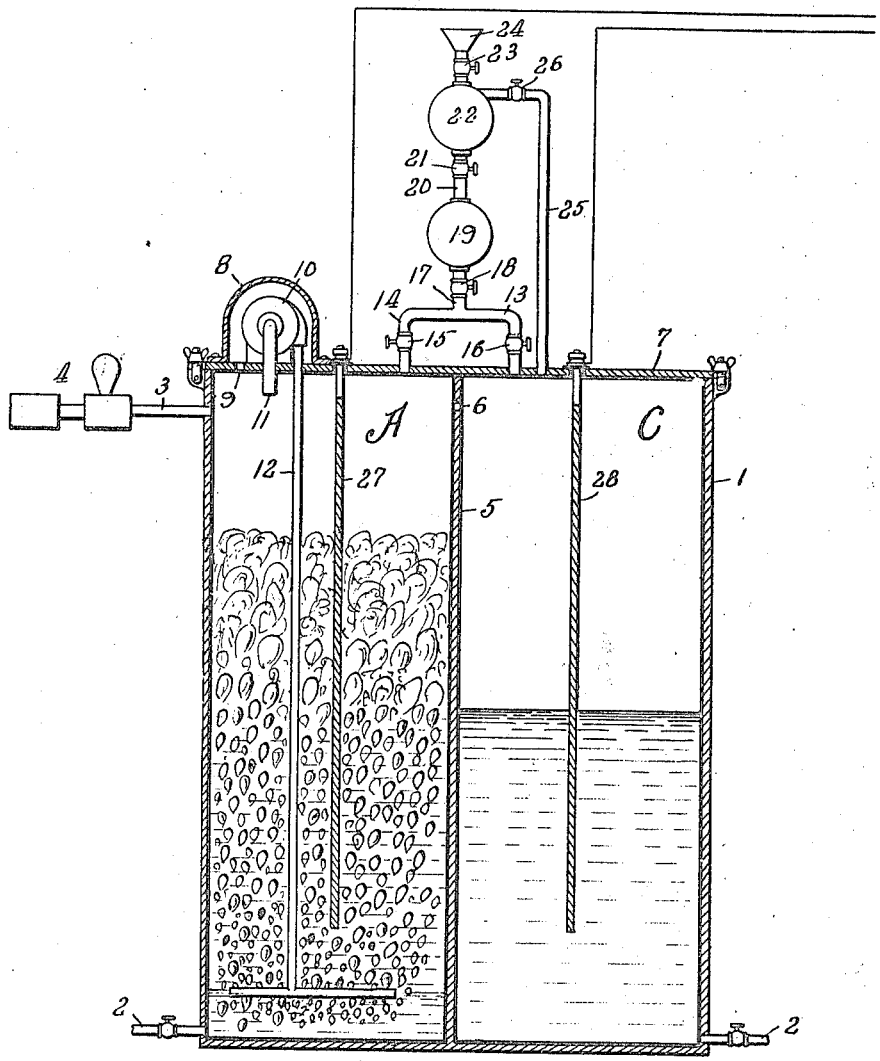

UNITED STATES PATENT OFFICE.

KARL P. McELROY, OF WASHINGTON, DISTRICT OF COLUMBIA, ASSIGNOR TO CHEMICAL DEVELOPMENT COMPANY, A CORPORATION OF MAINE.

PROCESS OF AND APPARATUS FOR OXIDIZING HYDROCARBONS.

1,253,617.     Specification of Letters Patent.     Patented Jan. 15, 1918.

Application filed August 2, 1912, Serial No. 712,975. Renewed March 18, 1916. Serial No. 85,200.

*To all whom it may concern:*

Be it known that I, KARL P. McELROY, a citizen of the United States, residing at Washington, in the District of Columbia, have invented certain new and useful Improvements in Processes of and Apparatus for Oxidizing Hydrocarbons, of which the following is a specification.

This invention relates to processes of oxidizing hydrocarbons; and it comprises a method of producing useful products from ethylene and other gaseous and highly reactive unsaturated hydrocarbons wherein such a hydrocarbon is submitted to a direct limited oxidation in solution, the progress of the reaction being so controlled as to limit the extent of the oxidization to the production of simple oxygen-containing derivatives of such hydrocarbon and to preserve unattacked hydrocarbon in the sphere of reaction during the course of such reaction; all as more fully hereinafter described and as claimed.

There are various oxygen-containing or oxidized derivatives of ethylene, such as glycol, the chlorhydrin, glycol esters, glycol ethers, ethylene oxid, etc., having properties which would render them useful in various arts if such derivatives could be produced by a method sufficiently simple, cheap and ready to make them commercially available. At present however these bodies are not available for technical purposes being merely laboratory curiosities, made when wanted for scientific purposes by indirect, cumbrous and wasteful methods. Ordinarily, ethylene, made from alcohol, is converted into a dihalid and this is then saponified or esterified to replace the halogen by other groups. Saponification and esterification are both operations attended with some difficulty and giving small yields since the dihalids are stable, little reactive substances. Glycol, for example, is usually made for scientific purposes by converting ethylene, produced from alcohol, into the dibromid, converting the dibromid into an acetic ester and finally saponifying the latter by alkali.

It is an object of the present invention to obtain these potentially valuable oxidized bodies from ethylene and other olefinic gases by a direct limited oxidation under controlled conditions. Ethylene which is typical of the other olefinic gases is a readily oxidizable substance but being endothermically constituted, oxidation is attended with the liberation of much energy and is apt to be too far going, while the direct products of its limited oxidation, ethylene oxid, glycol and chlorhydrin are themselves also readily oxidizable. Ethylene oxid, which is the first product of oxidation, is particularly sensitive; glycol is more resistive.

I have found however that under suitable conditions the oxidation of ethylene can be limited and regulated to the desired degree and that such a limited oxidation of the ethlyene itself is, so to speak, preferential over the further oxidation of these proximate oxidation products; that is, so long as unattacked ethylene remains in the sphere of reaction the oxidation merely goes to the first stage and the ethylene exercises a protective action shielding the proximate products from further attack. In the present invention therefore conditions are so controlled as to restrain the violence of reaction, the heat of reaction being absorbed or removed as fast as evolved so as to maintain a predetermined temperature range; and an excess of ethylene is maintained in the sphere of reaction throughout the course of such reaction. While other methods of temperature control may be, and usefully are, employed dilution of the reacting bodies is desirable as this also aids in controlling the progress of the reaction. As stated, ethylene is endothermic and tends to enter into reaction with accelerating velocity; and dilution is useful in damping down the violence of the action.

Dilution is useful in the limited oxidation of ethylene in the gaseous state by chlorin and steam, steam being best present in ample amount, and by oxygen in the presence or absence of catalytics, such as platinum black, labile oxids, nitrous vapors, etc.; and in the treatment of ethylene dissolved in various liquids; advantageously an aqueous liquid. The solubility of ethylene in most aqueous liquids is relatively small so that even a saturated solution thereof is still actually, as regards the ethylene, very dilute; and the heat of oxidation becomes a limited quantity readily taken up and controlled by the liquid solvent. In fact the solubility of ethylene as ethylene in most aqueous liquids is so small as compared with that of many of the ordinary oxidants that in oxidizing in aqueous solution special means must ordinarily be adopted to maintain the ethylene solution replenished with the gas and prevent the chance of an excess of such oxidant existing at any time during the reaction.

Several expedients to this end may be employed. One is an increase in pressure which causes a concomitant increase in the solubility of ethylene. With 15 pounds gage pressure, the amount which can be held in solution and drawn upon for reaction is about doubled. Another is quicker replenishment of the supply of dissolved ethylene by filming the liquid or otherwise increasing the area of contact between liquid and gas. Vigorous agitation of the liquid to prevent localized changes in the relative concentration of ethylene and oxidant is desirable. The increase in area of contact and the agitation may be simultaneously attained and a number of other desirable results secured by causing a cyclic circulation of the gas to, through and back to the reaction liquid; that is with a reaction chamber having a gas feed and means for withdrawal of waste gas there may be provided additional means capable of continuously taking gas from above the body of liquid and again bubbling it therethrough. Advantageously there may be employed a fan or blower. The fan means may be, and advantageously is, speeded up so as to maintain an emulsion of liquid and gas.

Another expedient often useful is to maintain porous, adsorptive materials, such as charcoal, coke, boneblack, platinum black, etc., suspended in the liquid in which the oxidant is contained or in which it is being developed to absorb gas and re-deliver it to the liquid. Such bodies may, and usually do, superadd a useful catalytic effect in aiding oxidation. For example, ethylene and air may be supplied to a hot liquid holding platinum black or colloidal palladium or the like in suspension.

Still another expedient is to maintain in contact with an aqueous reaction liquid or bath an oily liquid having a greater solvent power for ethylene to act, so to speak, as a store of ethylene. Oil of turpentine, for example, dissolves about 2½ times its volume of ethylene so that a drop of the oil saturated with a gas holds 2½ times as much ethylene as a bubble of the gas itself of the same size as such a drop. The use of an oily carrier of this kind is particularly advantageous with gases poor in ethylene, since it takes up ethylene and other unsaturated hydrocarbon gases with greater readiness than it does many other gases. In order to increase the surface of contact between the oily carrier and the aqueous oxidizing bath they should be kept emulsified together; and to promote ease of emulsification it is often useful to increase the specific gravity of the oil by mixing therewith heavy chlorinated oily bodies, such as chloroform, carbon tetrachlorid, Dutch liquid, etc., to an extent sufficient to make the specific gravities of the carrier and the bath at least approximately the same. And, vice versa, in using the heavy chlorinated products, a little petroleum hydrocarbon may be admixed to lighten them. However, with efficient stirring means the specific gravity of the carrier employed may not be important.

It is commonly useful to employ several of these expedients simultaneously as in feeding ethylene to an oxidizing chamber maintained under pressure as high as convenient, provided with means for cyclic gas circulation and containing in addition to the aqueous oxidizing bath an immiscible oily gas absorbent. However such expedients may be separately used.

The ethylene used in the present invention may be produced from any of the usual sources, as by dehydrating alcohol, by hydrogenating acetylene or by destructive distillation or cracking of coal, oil or other carbonaceous bodies. Using ordinary coal gas as a source of ethylene, it is useful to extract ethylene and other olefinic gases by means of wash oil; though the other oily carriers described may also be used. From the wash oil, the olefinic gases may be separated in a concentrated state by heating or vacuum. By proper precaution petroleum oil may be cracked down to form gas mixtures rich in ethylene, propylene and the butylenes; and useful in the present invention.

Acetylene may be hydrogenated to ethylene by catalytics or electrolytically.

Many oxidants may be used in the present invention, such as oxidizing salts, like permanganates, chromates, vanadates, arsenates, etc., in acid, alkaline or neutral baths. Peroxidized bodies, such as hydrogen peroxid, barium peroxid, calcium peroxid, sodium peroxid, perborates, persulfates, etc., may also be used. Manganese binoxid and an acid may be employed. Bleaching powder containing a trace of cobalt or other catalytic causing an evolution of nascent oxygen may be used. When ethylene chlorhydrin is desired, the bleaching powder may be acidulated with a weak acid. Or chlorin may be led into or formed in an aqueous solution of ethylene which may also contain neutralizing bodies, such as magnesia, chalk, soda, etc., to neutralize the HCl formed.

With many of these oxidants, the addition of the same or the development of its oxidizing influence should be proportionate to the rate of solution of ethylene; there should always be unattacked ethylene in the sphere of reaction.

It is advantageous to develop the oxidizing influence electrolytically, as this gives a better control of conditions and of the rate of development of such oxidizing influence. The rate of development can be readily adjusted to the rate of solution of the ethylene. Either diaphragmed or diaphragmless cells may be used. With a diaphragmed cell acetylene may be hydrogenated to ethylene in the cathode compartment and the ethylene oxidized in the anode compartment.

Any suitable electrolyte may be employed. With a saline solution, the alkaline cathode fluid may ultimately be used to neutralize the acid anode fluid to make a neutral solution from which the oxidation products may be regained. Any suitable anode metal and cathode metal may be used, and any suitable dissolved carrier such as titanium, cerium, manganese, iron, chromium, etc., salts may be used. Sulfate of soda is suitable for many purposes as a dissolved electrolyte. With salt (sodium chlorid) and other halogen compounds, the oxidation generally gives ethylene chlorhydrin which may be saponified to glycol with the soda accumulating in the cathode compartment. Ethylene chlorhydrin may be produced in any of the cells ordinarily employed for making hypochlorites, by using ethylene, or gases containing the same, as a depolarizer.

In the manufacture of caustic soda, it is an economical procedure to pass acetylene into the cathode compartment to act as a depolarizer and also produce ethylene, while the ethylene may be similarly used as a depolarizer in the anode compartment, producing either chlorhydrin or Dutch liquid as the case may be. In this way the consumption of energy for the production of caustic soda may be much lessened while useful products are obtained to aid in paying the expense of the operation.

In the accompanying illustration I have shown, more or less diagrammatically, a generalized type of apparatus which may be used in many of the reactions described herein. In this showing Reference character 1 indicates a vessel which may be of any suitable material, such as sheet steel, appropriately coated with a resistant inner lining. This is advantageously built so as to withstand internal pressure. It is provided with valved draw-off outlets 2 for removing liquid. It is also provided with inlet 3, supplied by pressure pump 4, through which an olefinic gas, or mixtures of such gas with any other gas desired, may be supplied under any convenient pressure. As shown, the vessel is particularly adapted for electrolytic purposes and is provided with diaphragm 5 of any usual material dividing it into an anode chamber A and cathode chamber C. This diaphragm is advantageously perforated at 6 to allow equalization of gas pressure on the two sides. The vessel is provided with cover 7 which may be clamped on in any suitable manner. This cover carries hood 8 having communication with the chamber of the vessel through orifice 9. This equalizes the chamber pressure with that of the hood 8. Within this hood is mounted any simple type of blower or pump, shown here as rotary fan 10. This blower has communication with the gas space within the chamber at 11 and is provided with conduit 12 extending nearly to the bottom of the vessel. The lid may also be provided with two conduits 13 and 14 placed on each side of the diaphragm and valved respectively at 15 and 16. These two conduits unite as conduit 17, valved at 18, which expands into chamber 19. Above this chamber is a length of tubing 20, valved at 21, and connecting with another chamber 22, above which is valve 23 and hopper or funnel 24. Equalizing pipe 25, valved at 26, allows equalization of pressure. This last described device enables equalization of gas pressure with that of the chamber by opening appropriate valves; and it also allows liquid to be fed to either side of the diaphragm and without disturbance of the chamber pressure. For example, a liquid may be fed into 24, and, valves 26 and 21 being closed, may be fed into 22 by opening valve 23. By now closing valve 23 and opening 26 and 21, (valve 18 being normally open) the liquid may be caused to pass down into 19 and thence by 16 or 15, the liquid may be discharged on either side of the diaphragm.

Anode 27 and cathode 28 may be of any suitable metal or structure adapted to a particular electrolysis.

In one embodiment of the present invention, using electrolytic oxidation, the vessel may be charged on both sides of the diaphragm with a solution of sulfate of soda of such strength as to give good conduction. Ethylene, or gas containing ethylene, may now be introduced into the apparatus by means of pump 4 at any pressure desired, say, 4 or 5 atmospheres. Upon now starting blower 10 into operation, the liquid may be kept thoroughly saturated with dissolved ethylene. It is advantageous to run this pump or blower at such a rate that the liquid is maintained as more or less of an emulsion of gas and liquid; as a foamy mass. Upon now passing a current through the device in such a manner that 27 becomes the anode, the ethylene is oxidized to glycol which goes into solution. Nascent oxygen, ozone, hydrogen peroxid, etc., produce at the anode an oxidation of ethylene in the presence of water to form glycol. The rate of development of the oxygen should be limited according to the rate of solution of ethylene so that an excess of ethylene shall remain in the solution at all times. Should the solution temporarily become exhausted of ethylene, there would be danger of the oxidation of glycol to form glycolic acid, etc. For this reason the current should be regulated in correspondance with the supply of dissolved ethylene. The apparatus may be run discontinuously, a charge of ethylene, or gas containing the same, as for example, a pyrolytic oil gas containing say 40 to 50 per cent. of ethylene and other olefins, introduced and the pump 10 kept in operation until the ethylene of the charge has become absorbed and oxidized. At this time the current may be interrupted and waste gas vented through 14. Another charge of ethylene, or gas containing the same, may now be introduced and so on until the concentration of glycol in the solution becomes as high as may be desired. In the electrolytic operation using sodium sulfate as the conductive electrolyte, alkali of course is developed in the cathode compartment in amount corresponding to the amount of acid in the anode compartment. At the end of the operation, by uniting the anode fluid and the cathode fluid, a neutral saline solution is regained and from this glycol may be isolated in ways similar to the ways of recovering glycerin from salt lyes its properties, as well as its uses, being very similar to those of glycerin. Like glycerin it is a dense, high boiling liquid which however can be blown over readily with steam. The anode may be of platinum, carbon or lead. The anode fluid may contain a carrier oxidant, such as a chrominum salt, a cerium salt, a manganese salt, etc. Other oxygen salts, such as phosphates, borates, etc., may be used in lieu of the sulfate, but the sulfates are advantageous. Sulfate of soda is a good sulfate.

In the anode chamber may be maintained a little suspended platinum black, charcoal, boneblack, etc., if desired. It may also contain an oil having solvent properties for ethylene, such as turpentine, mineral oil, etc. With proper manipulation and the maintenance of dissolved ethylene in the solution at all times, oxidation will be restricted to the ethylene.

By substituting a solution of common salt in the cell for the solution of sulfate of soda just described but otherwise operating in the same manner, the reaction with oil gas will produce ethylene chlorhydrin and other chlorhydrins. In this action since chlorin is withdrawn from the sphere of reaction in the form of chlorhydrin which is a neutral body, the alkalinity of the cathode fluid increases more rapidly than the acidity of the anode liquid. The operation may be continued until the per cent. of salt converted into alkali and chlorhydrin is as high as may be desired, the liquid being replenished with salt from time to time if desired. Operating in this manner the process becomes the manufacture of caustic soda with the use of ethylene as a depolarizer to reduce the current consumption and with the production of a valuable byproduct, the chlorhydrin, in lieu of chlorin. Ethylene chlorhydrin is valuable as a solvent in addition to its value as a material for conversion into glycol.

In case it is desired to form glycol from the chlorhydrin, the anode fluid and the cathode fluid may be united and heated with such chlorhydrin under pressure. Without pressure the action of caustic alkali on the chlorhydrin is to convert it into the corresponding oxid. The alkalinity of the cathode fluid is sufficient to neutralize the acidity of the anode fluid and also to hydrolyze the chlorhydrin which has been formed.

In using salt as the electrolyte, the diaphragm may be dispensed with and the cell worked under conditions analogous to those employed in making hypochlorites. Operating in this way, the cathode should be of small effective area to give a high current density and permit the escape of hydrogen. For this latter purpose, it may be provided with a conduit for taking away hydrogen. The ethylene being present to unite with the chlorin and with hydroxyl, the cell does not produce hypochlorites as long as it remains in excess.

In working with salt as an electrolyte, it is desirable to keep the temperatures low and to maintain the stated excess of ethylene present. In the absence of an excess of dissolved ethylene, if the electrolysis be pushed, chlorin formed as such may combine with gaseous ethylene to form Dutch liquid. This however is a valuable material.

Operating with pure ethylene, such as that made by the hydrogenation of acetylene, in the cell having a dissolved oxygen salt, pure glycol will be formed. But with pyrolytic gases containing ethylene, such as those obtained by cracking oils at low temperatures, there will usually be propylene and the butylenes present. These also make valuable glycols. Using pure ethylene in a cell having a chlorid as the electrolyte, similarly pure chlorhydrin, or chlorhydrin and Dutch liquid, will be produced. But with pyrolytic gases containing other olefins than ethylene, other chlorhydrins and chlorids may be obtained.

The present process may be used in connection with pure propylene or the butylenes in the manufacture of propylene glycol and propylene chlorhydrins, butylene glycols and butylene chlorhydrins.

In one modification of my invention, I may mount a gas circulating device on the cathode chamber C as well as on the anode chamber A, and in the former I may circulate acetylene. The acetylene acts as a depolarizer, combining with hydrogen to form ethylene and reducing the current consumption. This ethylene may now be transferred to the anode chamber and oxidized to form glycol or chlorhydrin as the case may be.

Running a cell for the production of caustic soda from brine in this manner, the current consumption is much reduced. In hydrogenating acetylene in this manner, it is useful to employ cathodes of nickel, cobalt and the like.

Apparatus of the type described and shown may also be used for non-electrolytic methods under the present invention. By omitting diaphragm 5, anode 27 and cathode 28, an oxidizing liquid may be fed in at a regulated rate through funnel 24 and connected parts. This oxidizing liquid may be a milk of bleaching powder. The rate of feed should be such as not to exceed the rate of solution of ethylene in the fluid of the chamber. Potassium permanganate solution may be fed in in the same manner. Many other oxidizing fluids may be similarly used. Or a charge of bleaching powder and water may be fed in through 24 and connected parts and then a mixture of carbon dioxid and ethylene fed in by pump 4. The carbon dioxid will decompose the bleaching powder forming hypochlorous acid which will unite with the ethylene to form chlorhydrin. Or the apparatus may be charged with bleaching powder and water containing a very small proportion of a cobalt salt and ethylene fed in and circulated as before. In the presence of a cobalt salt as a catalyst, bleaching powder gives up oxygen at a slow rate; and this oxygen will oxidize the ethylene. The rate may be controlled by controlling the amount of cobalt salt present and should be such that the rate of development of oxygen will not exceed the rate of solution of ethylene.

In another modification, the apparatus may be maintained at any suitable pressure and temperature and a mixture of ethylene and oxygen, or air, fed in and circulated, the liquid being kept charged with suspended or dissolved catalytic, such as platinum black, palladium, alkaline manganate, etc. The ethylene should be in excess of the oxygen at all times.

Using the rocker type of cell in electrolyzing brine, acetylene may be hydrogenated by contacting with the mercury in the soda compartment and the ethylene produced used as an anodic depolarizer in forming chlorhydrin.

Gaseous acetylenic hydrocarbons, such as acetylene, and gaseous diolefinic hydrocarbons, as well as gaseous olefins, may be advantageously oxidized by the present process.

In using weak ethylenic gases, such as those from cracking oil, from acetylene hydrogenated by nickel in the presence of a diluent gas, etc., if operating with a single electrolytic cell discontinuously, that is, with successive charges of gas introduced and circulated until the ethylene is absorbed, there is a periodic variation in the strength of current required. For example, with a fresh charge of oil gas containing, say, 45 per cent. ethylene and other olefins with the residue largely ethane, the absorption of the gas is at first relatively rapid, but as the ethylene disappears solution becomes slower; being for instance considerably slower when the richness in ethylene is reduced to 30 per cent. This may need a corresponding change in the current supply. By operating a number of cells in series, as regards the gas feed, each such cell venting gas into the next in series, this inconvenience may be overcome, each cell then operating with gases of a constant average content; the first, say with gas averaging 40 per cent., the next with gas averaging 30 per cent., and so on, each cell then having a constant current supply.

Gas of any desired degree of purity may however be obtained from lean ethylenic gas by scrubbing the latter by a countercurrent of spirits of turpentine, heavy oil or any other solvent for ethylene, exhausting the charged solvent by vacuum or heat, or both, and returning the exhausted solvent for fresh use with the gas to be scrubbed. The rich ethylene obtained by exhausting the charged oil may then be oxidized.

The manufacture of chlorhydrin is not specifically claimed in this case, it forming part of the matter of certain later but co-pending applications Serial Nos. 34,678, filed June 17, 1915; 35,505, filed June 22, 1915; 35,646, filed June 22, 1915; 65,983, filed Dec. 9, 1915; 107,564, filed July 5, 1916; 147,465, filed Feb. 8, 1917.

What I claim is:—

1. The process of preparing useful products which comprises submitting an unsaturated gaseous hydrocarbon to limited oxidation, such hydrocarbon being maintained in excess in the sphere of reaction during such oxidation.

2. The process of preparing useful products which comprises submitting a gaseous olefinic hydrocarbon to limited oxidation, such hydrocarbon being maintained in excess in the sphere of reaction during such oxidation.

3. The process of preparing useful products which comprises submitting a gas comprising ethylene to limited oxidation, such ethylene being maintained in excess in the sphere of reaction during such oxidation.

4. The process of making useful products which comprises subjecting a gaseous unsaturated hydrocarbon to limited anodic oxidation, such gaseous hydrocarbon being maintained in excess in the sphere of reaction during such oxidation.

5. The process of making useful products which comprises subjecting a gaseous olefinic hydrocarbon to limited anodic oxidation.

6. The process of making useful products which comprises subjecting a gas comprising ethylene to limited anodic oxidation.

7. The process of making useful products which comprises subjecting a gaseous unsaturated hydrocarbon to limited anodic oxidation with a sulfate electrolyte, such gaseous hydrocarbon being maintained in excess in the sphere of reaction during such oxidation.

8. The process of making useful products which comprises subjecting a gaseous olefinic hydrocarbon to limited anodic oxidation with a sulfate electrolyte.

9. The process of making useful products which comprises subjecting a gas comprising ethylene to limited oxidation with a sulfate electrolyte.

10. The process of making useful products which comprises electrolyzing sodium sulfate solution in the presence of a gaseous unsaturated hydrocarbon as a depolarizer.

11. The process of making useful products which comprises electrolyzing sodium sulfate solution in the presence of a gaseous unsaturated hydrocarbon as an anodic depolarizer.

12. The process of making useful products which comprises electrolyzing sodium sulfate solution in the presence of a gaseous olefinic hydrocarbon as an anodic depolarizer.

13. The process of making useful products which comprises electrolyzing sodium sulfate solution in the presence of a gas comprising ethylene as an anodic depolarizer.

14. In the electrolysis of solution of salts, the process which comprises electrolyzing a solution of a suitable salt in a divided cell, hydrogenating acetylene in the cathode compartment to produce ethylene and transferring the ethylene to the anode compartment to act as a depolarizer and produce chlorhydrin.

15. In the oxidation of unsaturated gaseous hydrocarbons in aqueous solution, the process which comprises maintaining in contact with such solution an oily solvent for such hydrocarbon while passing a current of such hydrocarbon through such solution.

16. In the oxidation of unsaturated gaseous hydrocarbons in aqueous solution, the process which comprises maintaining in contact with such solution a substance having the power of physically absorbing such hydrocarbon while passing a current of such hydrocarbon through such solution.

17. In the anodic oxidation of gaseous hydrocarbons, the process which comprises establishing an electrolytic current through a suitable electrolyte, and transmitting a current of such gaseous hydrocarbon through the electrolyte while maintaining in contact with said electrolyte an oily fluid having a solvent power for said gaseous hydrocarbon.

18. In the oxidation of ethylene, the process which comprises supplying ethylene gas under pressure to an aqueous liquid wherein oxidizing conditions are maintained in such manner as to maintain an excess of ethylene in the sphere of reaction at all times.

19. In the oxidation of ethylene the process which comprises supplying gas comprising ethylene under pressure to a closed chamber containing a body of aqueous liquid wherein oxidizing conditions are maintained, and causing a cyclic circulation of the gas so supplied through said body of liquid.

20. In the oxidation of olefinic gases, the process which comprises progressively developing oxidizing influences in a body of aqueous liquid and supplying dissolved olefinic gas to such liquid at a rate sufficiently rapid to maintain an excess of dissolved gas at all times during the oxidation.

21. In the oxidation of ethylene, the process which comprises progressively developing oxidizing influences in a body of aqueous liquid and supplying dissolved ethylene to such liquid at a rate sufficiently rapid to maintain an excess of dissolved ethylene at all times during oxidation.

22. In the treatment of difficultly soluble gases in solution, the process which comprises establishing reactive conditions in a body of liquid in a suitable chamber, supplying gas to be treated to said chamber and establishing a cyclic circulation of said gas independent of the supply thereof from a point above the liquid body to and through such body.

23. In the oxidative treatment of difficultly soluble gases in solution, the process which comprises establishing reactive oxidizing conditions in a body of liquid in a suitable chamber, supplying gas to be treated to said chamber and establishing a cyclic circulation of said gas independent of the supply thereof from a point above the liquid body to and through said body, said circulation being at a sufficiently rapid rate to maintain said body vesicular with said gas.

24. In the depolarization of electrolytic cells, the process which comprises supplying a feed of depolarizing gas to such a cell while maintaining an independent cyclic circulation of said gas through liquid in said cell, said circulation being sufficiently rapid to maintain said liquid in a foamy state.

25. In the manufacture of solvents, the process which comprises electrolyzing a liquid with a suitable anode and cathode, supplying a feed of gas comprising a gaseous olefin and producing a rapid cyclic circulation of such gas through the electrolyzing fluid in the vicinity of the anode.

26. In the manufacture of solvents, the process which comprises electrolyzing a liquid with a suitable anode and cathode, supplying a feed of gas comprising ethylene and producing a rapid cyclic circulation of such gas through the electrolyzing fluid in the vicinity of the anode.

27. In oxidizing apparatus, a closed vessel, means for electrolyzing liquid therein, means for supplying gas thereto, means for removing waste gas therefrom and means for producing an independent cyclic circulation to gas within such vessel.

28. In oxidizing apparatus, a closed vessel, means for electrolyzing liquid therein, means for supplying gas thereto, means for removing waste gas therefrom and means for producing an independent cyclic circulation of gas within such vessel, such means comprising a fan having an inlet in the top of said vessel and an outlet conduit terminating in its base.

29. In an electrolytic apparatus, a closed cell provided with an anode and a cathode, means for feeding gas to said cell, means for withdrawing waste gas from such cell and independent means for producing cyclic circulation of gas within such cell.

30. In an electrolytic apparatus, a closed cell provided with an anode and a cathode, means for feeding gas to said cell, means for withdrawing waste gas from such cell and independent means for producing cyclic circulation of gas within such cell, such means comprising a fan having an inlet in the top of said cell and an outlet conduit terminating in its base.

31. In the manufacture of useful products, the process which comprises submitting an unsaturated hydrocarbon to limited oxidation, and during said oxidation and while supplying hydrocarbon to the reaction chamber continuously maintaining therein oxidizing conditions.

32. The process of manufacturing useful products which comprises producing a gaseous mixture containing an olefin and treating said mixture to produce an addition compound of said olefin containing at least one alcohol radical.

33. The process which comprises producing a gaseous mixture containing a gaseous olefin and flowing said gas in intimate contact with an aqueous solution capable of delivering an alcohol radical, whereby a substantial proportion of the olefin reacts with a portion of said solution to form an addition compound containing at least one alcohol radical.

In testimony whereof, I affix my signature in the presence of two subscribing witnesses.

K. P. McELROY.

Witnesses:
   JOHN H. SIGGERS,
   H. SCHOENTHAL.